US012680145B2

(12) United States Patent
Zhong

(10) Patent No.: US 12,680,145 B2
(45) Date of Patent: Jul. 14, 2026

(54) METHOD FOR RECOVERING HAFNIUM AND IMPURITY METALS FROM HAFNIUM-CONTAINING WASTE RESIDUE

(71) Applicant: Jiangxi Zhongha New Material Co., Ltd., Ganzhou (CN)

(72) Inventor: Minglong Zhong, Shenzhen (CN)

(73) Assignee: Jiangxi Zhongha New Material Co., Ltd., Ganzhou (CN)

( * ) Notice: Subject to any disclaimer, the term of this patent is extended or adjusted under 35 U.S.C. 154(b) by 399 days.

(21) Appl. No.: 18/290,157

(22) PCT Filed: Jul. 7, 2022

(86) PCT No.: PCT/CN2022/104405

§ 371 (c)(1),
(2) Date: Nov. 10, 2023

(87) PCT Pub. No.: WO2024/000614

PCT Pub. Date: Jan. 4, 2024

(65) Prior Publication Data

US 2025/0084504 A1     Mar. 13, 2025

(51) Int. Cl.
C22B 34/14         (2006.01)
C01G 27/02        (2006.01)
C22B 3/22          (2006.01)
C22B 3/32          (2006.01)

(52) U.S. Cl.
CPC .............. C22B 34/14 (2013.01); C01G 27/02 (2013.01); C22B 3/22 (2013.01); C22B 3/322 (2021.05)

(58) Field of Classification Search
CPC .......... C22B 34/14; C22B 3/22; C22B 3/322; C22B 3/08; C22B 3/3846; C22B 3/44; C22B 3/3844; C22B 7/007; C22B 34/125; C22B 34/22; C22B 34/24; C22B 34/32; C22B 34/34; C22B 34/36; C22B 47/00; C22B 59/00; C22B 61/00; C01G 27/02; Y02P 10/20
See application file for complete search history.

(56) References Cited

U.S. PATENT DOCUMENTS

| | | | |
|---|---|---|---|
| 8,557,202 B1 | 10/2013 | Lee et al. | |
| 2020/0024151 A1* | 1/2020 | Xu | C22B 34/14 |
| 2020/0024687 A1* | 1/2020 | Xu | C22B 7/007 |

FOREIGN PATENT DOCUMENTS

| | | | | |
|---|---|---|---|---|
| CN | 101759230 | * | 6/2010 | C01G 27/02 |
| CN | 101759230 A | | 6/2010 | |
| CN | 102417986 A | | 4/2012 | |
| CN | 104046777 B | | 4/2016 | |
| CN | 107720820 A | | 2/2018 | |
| CN | 107686898 B | | 5/2019 | |
| CN | 111020230 A | | 4/2020 | |
| CN | 108118150 B | | 4/2021 | |

OTHER PUBLICATIONS

Machine Translation of CN 101759230 to Chen, et al. (Year: 2010).*

* cited by examiner

*Primary Examiner* — Daniel C. Mccracken

(57)         ABSTRACT

A method for recovering hafnium and impurity metals from a hafnium-containing waste residue, comprises dissolving the waste residue in sulfuric acid and ammonium sulfate to obtain an acidic solution, adjusting acidity of the acidic solution, and adding a complexing agent to obtain a material solution; conducting extraction to obtain a hafnium-loaded organic phase and an impurity metal ions-containing aqueous phase; subjecting the hafnium-loaded organic phase to purification, stripping, precipitation, and filtration, and washing and burning to obtain hafnium oxide; precipitating the impurity metal ions-containing aqueous phase, washing a resulting precipitate to remove the complexing agent; dissolving a resulting precipitates of the impurity metal ions in sulfuric acid, and adjusting acidity of a resulting solution to obtain a solution of the impurity metal ions; extracting the solution of the impurity metal ions to obtain an impurity metal ions-loaded organic phase, purifying and stripping to obtain oxides of the impurity metals.

17 Claims, No Drawings

METHOD FOR RECOVERING HAFNIUM AND IMPURITY METALS FROM HAFNIUM-CONTAINING WASTE RESIDUE

TECHNICAL FIELD

The present disclosure relates to the technical field of hydrometallurgy, and in particular to a method for recovering hafnium and impurity metals from a hafnium-containing waste residue.

BACKGROUND

Hafnium is a rare metal with excellent physical and chemical properties such as ductility, oxidation resistance, high temperature resistance, and corrosion resistance, and thus hafnium is widely used in various fields such as atomic energy, national defense, aerospace, supersonic aircraft, high temperature semiconductors, solar photovoltaics, electronic information, and metallurgical industry. With the rapid development of modernization of China, a demand for hafnium is increasing. Hafnium is obtained mainly through the following two ways: 1. Hafnium is obtained by separating zirconium and hafnium from a raw ore (a mass ratio of zirconium to hafnium is 50:1). 2. Hafnium is enriched from a hafnium-containing waste material. Hafnium minerals in China have a complicated composition, always coexist with other minerals, and have an extremely-low raw ore grade, a fine mineral inlay particle size, a large beneficiation difficulty, and a high production cost. The pressure of environmental protection has brought a great pressure to the supply of hafnium resources. Moreover, the current market demand for zirconium has become nearly saturated, and thus the acquisition of hafnium merely by separating zirconium and hafnium from raw ores is bound to cause imbalance in the application of zirconium. Therefore, the recycling of hafnium resources is an effective way to alleviate the short supply of hafnium resources. With the development of semiconductors from 20 nm and 14 nm to 7 nm, 5 nm, and 3 nm, purity requirements for hafnium are increasing, and it is difficult to continuously and effectively acquire high-purity hafnium in large quantities by the current hafnium separation method.

The patent CN201310077849.4 "Method for Separating Zirconium and Hafnium through Fractional Extraction with Tributyl Phosphate (TBP) Resin" discloses a recovery method, and the recovery method belongs to a TPB system and has advantages such as large extraction capacity and high separation coefficient. However, the disadvantages of the method are serious corrosion to equipment and easy emulsification during extraction, ultimately leading to failed extraction. Moreover, this recovery method has low adaptability to temperatures and high requirements for impurities in a raw material, and involves $HNO_3$ which heavily pollutes the environment.

The U.S. Pat. No. 8,557,202B1 "Separation Method of Zirconium and Hafnium with Acidic Extractants" discloses a recovery method, and the recovery method belongs to a TOA system and has advantages such as low pollution, small investment, and an extractant insoluble in water.

However, the disadvantages of the method are small organic load, mainly extracting zirconium, while exhibits poor extraction capacities for zirconium and hafnium, and low separation coefficient.

The patent CN201911258290.9 "Method for Producing Atomic Energy Level Hafnium Dioxide" discloses a method, and the method belongs to a TBP system. This patent solves the problem that the preparation of atomic energy level hafnium dioxide through precipitation in a hafnium-containing raffinate obtained after separation of zirconium and hafnium involves high cost, large wastewater amount, and unstable product quality; however, the method has disadvantages such as low adaptability to temperatures and high requirements for impurities in a raw material.

The patent CN201810005419.4 "Method for Separating Zirconium and Hafnium through Extraction with Hydrochloric Acid Medium" discloses a method, and the method belongs to a TPB system. This method has advantages such as large extraction capacity and high separation coefficient. However, the disadvantages of the method are serious corrosion to equipment, and easy emulsification during extraction, ultimately leading to failed extraction.

Moreover, this method has low adaptability to temperatures and high requirements for impurities in a raw material, and involves $HNO_3$ which heavily pollutes the environment.

The patent CN201710812052.2 "Method for Recovering Hafnium Oxide from Hafnium-containing Waste Material" discloses a method, and the method belongs to a TPB system. This method has advantages such as large extraction capacity and high separation coefficient, but has disadvantages such as serious corrosion to equipment. Moreover, emulsification is prone to occur during the extraction process, which ultimately causes failed extraction; and this method has low adaptability to temperatures and high requirements for impurities in a raw material, and involves $HNO_3$ which heavily pollutes the environment.

In addition to the TOA and TPB systems, an MIBK system is commonly used in industry; and the MIBK system is the only method that prioritizes the extraction of hafnium and is also the most common production way for separation of zirconium and hafnium. Although this method has high extraction efficiency, industrial wastewater of this method includes a thiocyanic acid (HSCN) complex that will produce hydrogen sulfide, hydrocyanic acid, mercaptan, or the like, and an exhaust gas of this method includes toxics such as high-purity ammonia, cyanides, and organic compounds, which are very harmful to the environment. In addition, this system is unstable, prone to decomposition, and difficult to control. Therefore, it is urgent to develop an eco-friendly recovery method for stably recovering high-purity hafnium in large quantities.

SUMMARY

A primary objective of the present disclosure is to overcome the shortcomings and deficiencies of the prior art and to provide a method for recovering hafnium and impurity metals from a hafnium-containing waste residue.

The objective of the present disclosure is achieved through the following technical solutions: A method for recovering hafnium and impurity metals from a hafnium-containing waste residue is provided, including the following steps:

(1) adjusting acidity of an acidic solution of the hafnium-containing waste residue to 1 mol/L to 3 mol/L, removing a resulting residue through filtration, and adding a complexing agent to a resulting mother liquor to obtain a material solution;

(2) conducting extraction with a mixture of an acidic phosphorus extractant, sulfonated kerosene, and sec-octanol as an organic phase and the material solution obtained in step (1) as an aqueous phase to obtain a hafnium-loaded organic phase and an impurity metal ions-containing aqueous phase; purifying the hafnium-loaded organic phase with a sulfuric acid solution; and subjecting a purified hafnium-loaded organic phase to stripping with a stripping liquid to obtain a hafnium-containing stripping solution;

(3) adding a precipitating agent to the hafnium-containing stripping solution obtained in step (2), filtering to obtain a precipitate, and washing and burning the precipitate to obtain hafnium oxide;

(4) precipitating the impurity metal ions-containing aqueous phase obtained in step (2) with a strong alkali; washing a resulting precipitate to remove the complexing agent to obtain precipitates of the impurity metal ions; and adding a sulfuric acid solution to adjust acidity of a resulting solution from the precipitates of the impurity metal ions and the sulfuric acid solution to 1 mol/L to 5 mol/L and to obtain a solution of the impurity metal ions;

(5) conducting extraction with a mixture of an acidic phosphorus extractant, sulfonated kerosene, and sec-octanol as an organic phase and the solution of the impurity metal ions obtained in step (4) as an aqueous phase to obtain an impurity metal ions-loaded organic phase; purifying the impurity metal ions-loaded organic phase with a sulfuric acid solution; and subjecting a purified impurity metal ions-loaded organic phase to stripping with a stripping liquid to obtain an impurity metal ions-containing stripping solution; and (6) adding a precipitating agent to the impurity metal ions-containing stripping solution obtained in step (5), filtering to obtain a precipitate, and washing and burning the precipitate to obtain oxides of the impurity metals.

Preferably, the acidic solution of the hafnium-containing waste residue in step (1) is obtained by dissolving the hafnium-containing waste residue in sulfuric acid and ammonium sulfate; more preferably, the acidic solution of the hafnium-containing waste residue in step (1) is obtained by mixing the hafnium-containing waste residue with concentrated sulfuric acid and ammonium sulfate and conducting a complete reaction at 200 C to 300 C; and most preferably, the hafnium-containing waste residue, the concentrated sulfuric acid, and the ammonium sulfate are mixed in a mass ratio of 1:(2-5):(0.8-1.5).

In the present disclosure, an acidic solution system is prepared with sulfuric acid and ammonium sulfate; and the acidic solution system is stable, has high adaptability to temperatures, exhibits higher adaptability for impurities than a single sulfuric acid system, and is suitable for a variety of impurities. The solubility of sulfuric acid is relatively low, and the addition of ammonium sulfate can increase the solubility. If the ammonium sulfate is not added, niobium and tantalum with similar properties to hafnium will be enriched with hafnium. In addition, the ammonium sulfate can play a complexing role.

In the present disclosure, the acidity of the acidic solution is adjusted with water to 1 mol/L to 3 mol/L, and in this acidity range, separation coefficient of hafnium from other elements and impurities is large.

Preferably, in step (1), the complexing agent is ammonium sulfate or an organic acid; and more preferably, the organic acid is one or more selected from the group consisting of oxalic acid, acetic acid, and citric acid. The complexing agent used in the present disclosure can chelate with a metal ion in the material solution to produce a complex ion that can exist in the solution more stably than the metal ion, such that the metal can hardly be precipitated from the solution.

Preferably, in step (1), a volume of the complexing agent is 1% to 5% of a volume of the mother liquor. If the complexing agent is added at an excessive amount, pH of the solution will be increased, and a precipitate will be easily produced.

Preferably, in step (2), the acidic phosphorus extractant is P204 and/or P507.

Preferably, in step (2), the acidic phosphorus extractant, the sulfonated kerosene, and the sec-octanol in the organic phase are in a volume ratio of (1-8):(10-18):(1-2). When the acidic phosphorus extractant, the sulfonated kerosene, and the sec-octanol are used in this volume ratio for extraction, an optimal hafnium separation effect can be achieved.

The acidic phosphorus extractant is a class of oil-soluble organophosphorus compound that can chelate with or can be coordinated with a metal ion or a salt thereof. An acidic phosphorus extractant molecule is a reaction group, and a proton dissociation constant and a phosphoryl oxygen atomic charge density of the acidic phosphorus extractant molecule are directly related to a field effect of an XY group. A stereoscopic effect of the XY group has a significant impact on the extraction performance. Among dibasic phosphate esters, phosphomonoesters exhibit a strong chelating ability for metal ions. In terms of acidity, sulfonic acid>phosphoric acid>carboxylic acid. In general, the higher the acidity, the stronger the extraction capacity. However, a phosphoric acid extractant has a higher alkoxy content than a sulfonic acid extractant, and thus has a strong electron-absorbing effect, a large ionization constant, and a strong extraction capacity. The addition of the sec-octanol can stabilize and ensure separation coefficient.

After the extraction, 97% or more of hafnium in the material solution is extracted into the organic phase while a trace amount of impurity metal ions (such as titanium, zirconium, vanadium, niobium, tantalum, chromium, molybdenum, tungsten, manganese, thallium, rhenium, rare-earth metals (REMs) (lanthanum, cerium, praseodymium, neodymium, samarium, europium, gadolinium, terbium, dysprosium, holmium, erbium, thulium, ytterbium, lutetium, yttrium, and scandium)) in the material solution are brought into the organic phase, and 96.5% or more of the impurity metal ions in the material solution remain in the aqueous phase. After the purification, 99% or more of the impurity metal ions in the organic phase enter the aqueous phase, thereby allowing the deep separation of hafnium from the impurity metal ions. The hafnium-containing stripping solution obtained after the stripping contains high-purity hafnium.

Preferably, in step (2), a volume ratio of the organic phase to the aqueous phase is 1:(0.2-5).

Preferably, in step (2), the purification is conducted by adjusting pH of a resulting purifying system with sulfuric acid to 1 to 5; and more preferably, the purification is conducted by adjusting the pH of the resulting purifying system with a sulfuric acid solution to 3. The pH can be adjusted with sulfuric acid of an acidity of 5 mol/L to 6 mol/L. A volume ratio of the hafnium-loaded organic phase to the sulfuric acid solution is (3-6):1.

Preferably, in step (2), the stripping liquid has a concentration of 0.25 mol/L to 6 mol/L.

Preferably, in step (2), the stripping liquid is at least one selected from the group consisting of an oxalic acid solution, a sodium carbonate solution, and an ammonium bicarbonate solution.

Oxalic acid has little corrosion to equipment and can successfully strip hafnium. The stripping with sodium carbonate can reduce the consumption of the acidic phosphorus extractant, such that concentration of an acidic salt produced can be greatly reduced; and the addition of sodium carbonate will not cause the production of a carbonate precipitate because acidic phosphorus can complex metal ions in the extractant. When ammonium bicarbonate is used as the stripping liquid, the stripping efficiency is high, and a resulting organic phase can be returned directly to the extraction section for recycling. When an oxalic acid solution, a sodium carbonate solution, and an ammonium bicarbonate solution are used in combination as the stripping liquid, $CO_3^{2-}$ of ammonium bicarbonate will be combined with metal ions to produce complexes, which can eliminate the precipitation caused by the use of oxalic acid, strip all metal ions without introducing impurity metal ions, and further simplify the process.

Preferably, in step (2), a volume ratio of the purified hafnium-loaded organic phase to the stripping liquid is (3-6):1.

Time consumed for each of the extraction, the purification, and the stripping in step (2) is not limited, as long as a reaction is complete.

In the produced hafnium oxide product, impurity of $HfO_2$ stably reaches 99.9% or more, or may even reach 99.999%, or 10 ppm lower, and contents of oxides of impurity metal ions such as titanium, zirconium, vanadium, niobium, tantalum, chromium, molybdenum, tungsten, manganese, thallium, rhenium, and REMs (lanthanum, cerium, praseodymium, neodymium, samarium, europium, gadolinium, terbium, dysprosium, holmium, erbium, thulium, ytterbium, lutetium, yttrium, and scandium) are lower than 0.1%.

When the stripping liquid in step (2) is an oxalic acid solution, in step (3), the precipitating agent is ammonia water and a resulting solution from the hafnium-containinging stripping solution and the precipitating agent has an endpoint pH ranging from from 8 to 10.

When the stripping liquid in step (2) is a sodium carbonate and/or ammonium bicarbonate solution, in step (3), the precipitating agent is hydrochloric acid and a resulting solution from the hafnium-containing stripping solution and the precipitating agent has an endpoint pH ranging from 1 to 5, and temperature is controlled at 50° C. to 120° C.; and preferably, in step (3), the precipitating agent is hydrochloric acid and the resulting solution from the hafnium-containing stripping solution and the precipitating agent has an endpoint pH ranging from 1 to 3, and the temperature is controlled at 60° C. to 100° C.

Preferably, in step (3), the burning is conducted at 700° C. to 1,200° C.; and more preferably, in step (3), the burning is conducted at 800° C. to 950° C.

Preferably, the strong alkali is sodium hydroxide and/or potassium hydroxide.

A sodium hydroxide solution or a sodium hydroxide solid can be added to the impurity metal ions-containing aqueous phase to replace ammonium ions:

$$NH_3 \cdot H_2O \leftrightharpoons NH_4^+ + OH^-.$$

Therefore, after sodium hydroxide is added, $OH^-$ in the solution is increased and a reverse reaction is conducted, such that ammonium ions can be replaced.

In step (4), the precipitate is washed with water to remove the complexing agent.

In step (4), the acidity is adjusted with water or a sulfuric acid solution. When the acidity is adjusted to 1 mol/L to 5 mol/L, the solubility of the precipitate is excellent.

After the extraction, 97.5% or more of the impurity metal ions (titanium, zirconium, vanadium, niobium, tantalum, chromium, molybdenum, tungsten, manganese, thallium, rhenium, and REMs (lanthanum, cerium, praseodymium, neodymium, samarium, europium, gadolinium, terbium, dysprosium, holmium, erbium, thulium, ytterbium, lutetium, yttrium, and scandium)) in the material solution are extracted into the organic phase while a trace amount of hafnium is brought into the organic phase. After the purification, 97% or more of other impurities in the organic phase enter the aqueous phase, thereby allowing the deep separation of impurity metal ions from other impurities. The impurity metal ions-containing stripping solution obtained after the stripping contains high-purity impurity metal ions.

Preferably, in step (5), the acidic phosphorus extractant is P204 and/or P507.

Preferably, in step (5), the acidic phosphorus extractant, the sulfonated kerosene, and the sec-octanol in the organic phase are in a volume ratio of (1-10):(8-20):(1-3).

Preferably, in step (5), a volume ratio of the organic phase to the aqueous phase is 1:(0.1-8).

Preferably, in step (5), the sulfuric acid solution has an acidity of 3 mol/L to 8 mol/L.

Preferably, in step (5), a volume ratio of the impurity metal ions-loaded organic phase to the sulfuric acid solution is (2-8):1.

Preferably, in step (5), the stripping liquid is at least one selected from the group consisting of an oxalic acid solution, a sodium carbonate solution, and an ammonium bicarbonate solution; and more preferably, in step (5), the stripping liquid is at least one selected from the group consisting of a 1% to 18% oxalic acid solution, a 3% to 25% sodium carbonate solution, and a 3% to 25% ammonium bicarbonate solution.

Preferably, in step (5), a volume ratio of the purified impurity metal ions-loaded organic phase to the stripping liquid is (2-8):1.

Time consumed for each of the extraction, the purification, and the stripping in step (5) is not limited, as long as a reaction is complete.

When the stripping liquid in step (5) is an oxalic acid solution, in step (6), the precipitating agent is ammonia water and a resulting solution from the impurity metal ions-containing stripping solution and the precipitating agent has an endpoint pH ranging from 8 to 10.

When the stripping liquid in step (5) is a sodium carbonate or ammonium bicarbonate solution, in step (6), the precipitating agent is hydrochloric acid and a resulting solution from the impurity metal ions-containing stripping solution and the precipitating agent has an endpoint pH ranging from 1 to 5, and temperature is controlled at 50° C. to 120° C.; and preferably, in step (3), the precipitating agent is hydrochloric acid and the resulting solution from the impurity metal ions-containing stripping solution and the precipitating agent has an endpoint pH ranging from 1 to 3, and the temperature is controlled at 60° C. to 100° C.

Preferably, in step (6), the burning is conducted at 700° C. to 1,200° C.; and more preferably, in step (3), the burning is conducted at 800° C. to 950° C.

Preferably, in steps (2) and (5), the extraction refers to 3-5 stage countercurrent extraction, the purification refers to 3-4 stage countercurrent purification, and the stripping refers to 3-4 stage countercurrent stripping.

The organic phase obtained after each of the extraction, purification, and stripping in steps (2) and (5) can be recycled completely through 1-2 stage countercurrent water-washing regeneration.

A recovery object of the recovery method of the present disclosure is a hafnium-containing waste residue, and in the separation system of the present disclosure, hafnium is preferentially extracted, such that the consumption of an organic phase is significantly reduced, which reduces a cost of the recovery method and ensures high-purity of hafnium. In addition, the recovery method of the present disclosure has excellent stability and significantly increased yield, as evidenced by the organic phase required for extraction. The sulfuric acid+ammonium sulfate system causes little pollution to the environment, where ammonium sulfate itself is a complexing agent; and subsequently, oxalic acid and/or sodium carbonate and/or sodium bicarbonate are supplemented as complexing agents, and carbon dioxide is directly generated after the burning of the above complexing agents.

With the development of semiconductors from 20 nm and 14 nm to 7 nm, 5 nm, and 3 nm, purity requirements for hafnium are constantly increasing. The present applicant is the only one enterprise that can stably produce high-purity hafnium products in large quantities with a purity of 99.99%, 99.999%, or even 10 ppm or lower.

Compared with the prior art, the present disclosure has the following beneficial effects:

The present disclosure provides a method for preferentially extracting hafnium from a hafnium-containing waste residue. In the method, hafnium is separated from niobium and tantalum with similar properties to hafnium to obtain high-purity hafnium and oxides of high-purity impurity metals (including titanium, zirconium, vanadium, niobium, tantalum, chromium, molybdenum, tungsten, manganese, thallium, rhenium, REMs (lanthanum, cerium, praseodymium, neodymium, samarium, europium, gadolinium, terbium, dysprosium, holmium, erbium, thulium, ytterbium, lutetium, yttrium, and scandium), or the like). Through the recovery method of the present disclosure, yield of hafnium is 89% to 92%, and purity of hafnium may stably reach 99.9% or more, or may even reach 99.999%, or even 10 ppm or lower; and yield of metal elements such as titanium, zirconium, vanadium, niobium, tantalum, chromium, molybdenum, tungsten, manganese, thallium, rhenium, and REMs (lanthanum, cerium, praseodymium, neodymium, samarium, europium, gadolinium, terbium, dysprosium, holmium, erbium, thulium, ytterbium, lutetium, yttrium, and scandium) is 87% to 90%, and purity of these metal elements is greater than 97%.

The method of the present disclosure mainly has advantages such as stable system, large separation coefficient, and high separation efficiency, and high purity of hafnium oxide in the hafnium oxide product; meanwhile, impurity metal oxides rich in various metal elements can also be obtained, such that niobium, tantalum, rhenium, or the like can be further separated. The method of the present disclosure can produce hafnium oxide in large quantities with low production cost and small corrosion to equipment. The method has strong adaptability to temperatures and impurity types, and is suitable for various impurities. Hafnium separated by the method is high-purity hafnium. In addition, the recovery method of the present disclosure avoids the use of traditional harmful hydrofluoric acid, extractants, or the like, and thus is eco-friendly, which allows a double harvest in environmental protection and economic benefits.

DESCRIPTION OF EMBODIMENTS

The technical solutions of the present disclosure will be clearly and completely described below in conjunction with specific examples of the present disclosure. Obviously, the described examples are merely some rather than all of the examples of the present disclosure.

All other examples obtained by those of ordinary skill in the art based on the examples of the present disclosure without creative efforts should fall within the protection scope of the present disclosure.

Example 1

Step 1: Dissolution of a raw material: A hafnium-containing waste residue to be recycled in this example was derived from a high-temperature alloy waste component. The hafnium-containing waste residue was tested by glow discharge mass spectrometry (GD-MS) (ElementGD Plus), and test results showed that the hafnium-containing waste residue included the metal elements of hafnium, titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium); and a content of hafnium was 34.54% and a total content of other impurity metals was 42.82%. 1,000 g of the hafnium-containing waste residue was dissolved in concentrated sulfuric acid and ammonium sulfate, and a reaction was conducted at 250° C. for 3 h to obtain an acidic solution, where the hafnium-containing waste residue, the concentrated sulfuric acid, and the ammonium sulfate were in a mass ratio of 1:3.5:1.

Step 2: Adjustment of acidity of the acidic solution: The acidic solution obtained in step 1 was diluted with water to an acidity of 1.8 mol/L and filtered, and then 2% (v/v) ammonium sulfate was added as a complexing agent to obtain a material solution.

Step 3: Extraction of hafnium: Extraction was conducted with a mixture of an acidic phosphorus extractant P204, sulfonated kerosene, and sec-octanol (in a volume ratio of 3:14:1) as an organic phase and the material solution obtained in step 2 as an aqueous phase, where a ratio of the organic phase to the aqueous phase was controlled at 1:3.5, and the two phases were mixed for 20 min; and samples were collected from the tank and tested by GD-MS (ElementGD Plus) (the test below was conducted by the same method), and test results showed that 99.02% of hafnium in the material solution was extracted into the organic phase while 1.78% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 3 by adjusting a ratio of the organic phase to the aqueous phase, and the two phases were mixed for 30 min; then a purified hafnium-loaded organic phase (including 99.21% of hafnium in the hafnium-loaded organic phase) was obtained, and 99.98% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 3 mol/L oxalic acid solution was prepared as a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 97.97% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 377.008 g of a hafnium oxide product (in the $HfO_2$ product, content of impurity was 9 ppm and yield of hafnium was 92.56%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and acidity of the resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 98.34% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while 0.98% of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 99.71% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (98.76% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (98.65% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 80° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 530.432 g of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, purity of oxides of impurity metals was 99.975%, and yield of impurity metals was 92.14%).

Example 2

Step 1: Dissolution of a raw material: A hafnium-containing waste residue to be recycled in this example was derived from a high-temperature alloy waste component, and was the same as that in Example 1. The hafnium-containing waste residue was tested by GD-MS (ElementGD Plus), and test results showed that the hafnium-containing waste residue included the metal elements of hafnium, titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium); and a content of hafnium was 34.54% and a total content of other impurity metals was 42.82%. 1,000 g of the hafnium-containing waste residue was dissolved in concentrated sulfuric acid and ammonium sulfate, and a reaction was conducted at 250° C. for 3 h to obtain an acidic solution, where the hafnium-containing waste residue, the concentrated sulfuric acid, and the ammonium sulfate were in a mass ratio of 1:3.5:1.

Step 2: Adjustment of acidity of the acidic solution: The acidic solution obtained in step 1 was diluted with water to an acidity of 1.8 mol/L and filtered, and then 2% (v/v) oxalic acid was added as a complexing agent to obtain a material solution.

Step 3: Extraction of hafnium: Extraction was conducted with a mixture of an acidic phosphorus extractant P204, sulfonated kerosene, and sec-octanol (in a volume ratio of 3:14:1) as an organic phase and the material solution obtained in step 2 as an aqueous phase, where a ratio of the organic phase to the aqueous phase was controlled at 1:3.5, and the two phases were mixed for 20 min; and samples were collected from the tank and tested by GD-MS (ElementGD Plus), and test results showed that 98.50% of hafnium in the material solution was extracted into the organic phase while 2.01% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 3 by adjusting a ratio of the organic phase to the aqueous phase, and the two phases were mixed for 30 min; then a purified hafnium-loaded organic phase (including 98.93% of hafnium in the hafnium-loaded organic phase) was obtained, and 99.96% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 3 mol/L oxalic acid solution was prepared as a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 97.92% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 373.779 g of a hafnium oxide product (in the product, purity of $HfO_2$ purity was 99.999% and yield of hafnium was 91.76%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and acidity of a resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 97.91% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while 1.03% of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 99.54% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (97.89% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (97.48% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 80° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 517.252 g of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, purity of oxides of impurity metals was 98.992%, and yield of impurity metals was 89.85%).

Example 3

Step 1: Dissolution of a raw material: A hafnium-containing waste residue to be recycled in this example was derived from a zirconium tailing. The hafnium-containing waste residue was tested, and test results showed that the hafnium-containing waste residue included the metal elements of hafnium, titanium, zirconium, vanadium, niobium, tantalum, chromium, molybdenum, tungsten, manganese, thallium, rhenium, and REMs (yttrium and scandium); and a content of hafnium was 18.76% and a total content of other impurity metals was 48.15%. 1,000 g of the hafnium-containing waste residue was dissolved in concentrated sulfuric acid and ammonium sulfate, and a reaction was conducted at 300° C. for 2 h to obtain an acidic solution, where the hafnium-containing waste residue, the concentrated sulfuric acid, and the ammonium sulfate were in a mass ratio of 1:2:0.8.

Step 2: Adjustment of acidity of the acidic solution: The acidic solution obtained in step 1 was diluted with water to an acidity of 1 mol/L and filtered, and then acetic acid was added as a complexing agent in a volume proportion of 1% to obtain a material solution.

Step 3: Extraction of hafnium: Extraction was conducted with a mixture of an acidic phosphorus extractant P507, sulfonated kerosene, and sec-octanol (in a volume ratio of 8:18:2) as an organic phase and the material solution obtained in step 2 as an aqueous phase, where a ratio of the organic phase to the aqueous phase was controlled at 1:5, and the two phases were mixed for 10 min; and samples were collected from the tank and tested, and test results showed that 97.05% of hafnium in the material solution was extracted into the organic phase while 3.48% of impurity metal ions (including titanium, zirconium, vanadium, niobium, tantalum, chromium, molybdenum, tungsten, manganese, thallium, rhenium, and REMs (yttrium and scandium)) in the material solution were brought into the organic phase to obtain a hafnium-loaded organic phase; and the remaining impurity metal ions (including titanium, zirconium, vanadium, niobium, tantalum, chromium, molybdenum, tungsten, manganese, thallium, rhenium, and REMs (yttrium and scandium)) in the material solution remained in the aqueous phase to obtain an impurity metal ions-containing aqueous phase.

Step 4: Purification of hafnium: A sulfuric acid washing solution with an acidity of 6 mol/L was prepared and used as an aqueous phase to purify the hafnium-loaded organic phase obtained in step 3, where pH of a resluting purification system was controlled at 2 by adjusting a ratio of the organic phase to the aqueous phase, and the two phases were mixed for 10 min; then a purified hafnium-loaded organic phase (including 98.93% of hafnium in the hafnium-loaded organic phase) wad obtained, and 99.64% of titanium, zirconium, vanadium, niobium, tantalum, chromium, molybdenum, tungsten, manganese, thallium, rhenium, and REMs (yttrium and scandium) ions in the hafnium-loaded organic phase entered the aqueous phase, thereby allowing the deep separation of hafnium from the impurity metal ions.

Step 5: stripping of hafnium: A 1 mol/L sodium carbonate solution was prepared as a stripping liquid, and the purified hafnium-loaded organic phase obtained in step 4 was subjected to stripping with the stripping liquid, where a ratio of the organic phase to the aqueous phase was controlled at 6:1, and the two phases were mixed for 30 min; then a hafnium-containing stripping solution (including 97.92% of hafnium in the purified hafnium-loaded organic phase) was obtained.

Step 6: Precipitation and burning of hafnium: 3 mol/L hydrochloric acid was added as a precipitating agent to the hafnium-containing stripping solution obtained in step 5 (endpoint pH: 2) to precipitate hafnium, and the temperature was controlled at 60° C.; then filtration was conducted, and the resulting hafnium-containing precipitate was washed with water and burned at 800° C. to obtain 200.03 g of a hafnium oxide product (in the product, purity of $HfO_2$ was 99.974% and yield of hafnium was 90.41%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, vanadium, niobium, tantalum, chromium, molybdenum, tungsten, manganese, thallium, rhenium, and REMs (yttrium and scandium).

Step 8: Preparation of a solution of the impurity metal ions comprising impurity metal ions: A sulfuric acid solution was added to the precipitates of the impurity metal ions, and acidity of the resulting system was adjusted to 1 mol/L to obtain the solution of the impurity metal ions comprising titanium, zirconium, vanadium, niobium, tantalum, chromium, molybdenum, tungsten, manganese, thallium, rhenium, and REM (yttrium and scandium) ions.

Step 9: Extraction of impurity metal ions: Extraction was conducted with a mixture of an acidic phosphorus extractant P507, sulfonated kerosene, and sec-octanol (in a volume ratio of 10:20:3) as an organic phase and the solution of the impurity metal ions obtained in step 8 as an aqueous phase, where a ratio of the organic phase to the aqueous phase was controlled at 1:6, and the two phases were mixed for 30 min; and samples were collected from the tank and tested, and test results showed that 97.18% of titanium, zirconium, vanadium, niobium, tantalum, chromium, molybdenum, tungsten, manganese, thallium, rhenium, and REMs (yttrium and scandium) in the solution of the impurity metal ions were extracted into the organic phase while 2.95% of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 8 mol/L was prepared and used as an aqueous phase to purify the impurity metal ions-loaded organic phase comprising titanium, zirconium, vanadium, niobium, tantalum, chromium, molybdenum, tungsten, manganese, thallium, rhenium, and REM (yttrium and scandium) ions obtained in step 9 to obtain a purified impurity metal ions-loaded organic phase, where a ratio of the organic phase to the aqueous phase was controlled at 2:1, and the two phases were mixed for 20 min; and 99.13% of hafnium in the impurity metal ions-loaded organic phase entered the aqueous phase, thereby allowing the deep separation of titanium, zirconium, vanadium, niobium, tantalum, chromium, molybdenum, tungsten, manganese, thallium, rhenium, and REM (yttrium and scandium) ions (96.09% of the impurity metal ions in the impurity metal ions-loaded organic phase) from hafnium.

Step 11: stripping of impurity metal ions: A 4% sodium carbonate solution was prepared as a stripping liquid, and the purified impurity metal ions-loaded organic phase obtained in step 10 was subjected to stripping with the stripping liquid, where a ratio of the organic phase to the stripping liquid was controlled at 7:1, and the two phases were mixed for 15 min; then an impurity metal ions-containing stripping solution comprising titanium, zirconium, vanadium, niobium, tantalum, chromium, molybdenum, tungsten, manganese, thallium, rhenium, and REM (yttrium and scandium) ions (97.74% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, vanadium, niobium, tantalum, chromium, molybdenum, tungsten, manganese, thallium, rhenium, and REM (yttrium and scandium) ions obtained in step 11 (endpoint pH was controlled at 1 and temperature was controlled at 60° C.) to precipitate titanium, zirconium, vanadium, niobium, tantalum, chromium, molybdenum, tungsten, manganese, thallium, rhenium, and REM (yttrium and scandium) ions, filtration was conducted, and the resulting precipitate was washed with water and burned at 950° C. to obtain 568.196 g of oxides of titanium, zirconium, vanadium, niobium, tantalum, chromium, molybdenum, tungsten, manganese, thallium, rhenium, and REM (yttrium and scandium) (in the product, purity of oxides of impurity metals was 98.156%, and yield of impurity metals was 87.77%).

Example 4

Step 1: Dissolution of a raw material: A hafnium-containing waste residue to be recycled in this example was derived from a hafnium metal processing scrap. The hafnium-containing waste residue was tested, and test results showed that the hafnium-containing waste residue included the metal elements of hafnium, titanium, niobium, zirconium, and tantalum; and a content of hafnium was 84.41% and a total content of other impurity metals was 10.17%. 1,000 g of the hafnium-containing waste residue was dissolved in concentrated sulfuric acid and ammonium sulfate, and a reaction was conducted at 200° C. for 5 h to obtain an acidic solution, where the hafnium-containing waste residue, the concentrated sulfuric acid, and the ammonium sulfate were in a mass ratio of 1:5:1.5.

Step 2: Adjustment of acidity of the acidic solution: The acidic solution obtained in step 1 was diluted with water to an acidity of 3 mol/L and filtered, and then citric acid was added as a complexing agent in a volume proportion of 5% to obtain a material solution.

Step 3: Extraction of hafnium: Extraction was conducted with a mixture of an acidic phosphorus extractant P507, sulfonated kerosene, and sec-octanol (in a volume ratio of 1:10:1) as an organic phase and the material solution obtained in step 2 as an aqueous phase, where a ratio of the organic phase to the aqueous phase was controlled at 1:0.5, and the two phases were mixed for 30 min; and samples were collected from the tank and tested, and test results showed that 97.45% of hafnium in the material solution was extracted into the organic phase while 2.68% of impurity metal ions (including titanium, niobium, zirconium, and tantalum) in the material solution were brought into the organic phase to obtain a hafnium-loaded organic phase; and the remaining impurity metal ions (including titanium, niobium, zirconium, and tantalum) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 4 by adjusting a ratio of the organic phase to the aqueous phase, and the two phases were mixed for 20 min; then a purified hafnium-loaded organic phase (including 97.63% of hafnium in the hafnium-loaded organic phase) was obtained, and 99.71% of titanium, niobium, zirconium, and tantalum ions in the hafnium-loaded organic phase entered the aqueous phase, thereby allowing the deep separation of hafnium from the impurity metal ions.

Step 5: stripping of hafnium: A 6 mol/L ammonium bicarbonate solution was prepared as a stripping liquid, and the purified hafnium-loaded organic phase obtained in step 4 was subjected to stripping with the stripping liquid, where a ratio of the organic phase to the aqueous phase was controlled at 3:1, and the two phases were mixed for 30 min; then a hafnium-containing stripping solution (including 98.99% of hafnium in the purified hafnium-loaded organic phase) was obtained.

Step 6: Precipitation and burning of hafnium: 3 mol/L hydrochloric acid was added as a precipitating agent to the hafnium-containing stripping solution obtained in step 5 (endpoint pH: 3, and temperature: 100° C.) to precipitate hafnium, filtration was conducted, and the resulting hafnium-containing precipitate was washed with water and burned at 950° C. to obtain 901.587 g of a hafnium oxide product (in the product, purity of $HfO_2$ was 99.988% and yield of hafnium was 90.57%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, niobium, zirconium, and tantalum.

Step 8: Preparation of a solution of the impurity metal ions comprising impurity metal ions: A sulfuric acid solution was added to the precipitates of the impurity metal ions, and acidity of a resulting system was adjusted to 5 mol/L to obtain the solution of the impurity metal ions comprising titanium, niobium, zirconium, and tantalum ions.

Step 9: Extraction of impurity metal ions: Extraction was conducted with a mixture of an acidic phosphorus extractant P507, sulfonated kerosene, and sec-octanol (in a volume ratio of 1:8:1) as an organic phase and the solution of the impurity metal ions obtained in step 8 as an aqueous phase, where a ratio of the organic phase to the aqueous phase was controlled at 1:7, and the two phases were mixed for 30 min; and samples were collected from the tank and tested, and test results showed that 97.78% of titanium, niobium, zirconium, and tantalum in the solution of the impurity metal ions were extracted into the organic phase while 1.12% of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 4 mol/L was prepared and used as an aqueous phase to purify the impurity metal ions-loaded organic phase comprising titanium, niobium, zirconium, and tantalum ions obtained in step 9 to obtain a purified impurity metal ions-loaded organic phase, where a ratio of the organic phase to the aqueous phase was controlled at 8:1, and the two phases were mixed for 30 min; and 99.39% of hafnium in the impurity metal ions-loaded organic phase entered the aqueous phase, thereby allowing the deep separation of titanium, niobium, zirconium, and tantalum ions (95.87% of the impurity metal ions in the impurity metal ions-loaded organic phase) from hafnium.

Step 11: stripping of impurity metal ions: A 2% oxalic acid solution was prepared as a stripping liquid, and the purified impurity metal ions-loaded organic phase obtained in step 10 was subjected to stripping with the stripping liquid, where a ratio of the organic phase to the stripping liquid was controlled at 8:1, and the two phases were mixed for 10 min; then an impurity metal ions-containing stripping solution comprising titanium, niobium, zirconium, and tantalum ions (97.08% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Ammonia water was added as a precipitating agent to the impurity metal ions-containing stripping solution with titanium, niobium, zirconium, and tantalum ions obtained in step 11 (endpoint pH was controlled at 8) to precipitate titanium, niobium, zirconium, and tantalum ions, filtration was conducted, and the resulting precipitate was washed with water and burned at 800° C. to obtain 119.662 g of oxides of titanium, niobium, zirconium, and tantalum (in the product, purity of oxides of impurity metals was 98.449%, and yield of impurity metals was 87.52%).

Example 5

Step 1: Dissolution of a raw material: A hafnium-containing waste residue to be recycled in this example was derived from a tantalum tailing. The hafnium-containing waste residue included the metal elements of hafnium, titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium); and a content of hafnium was 13.48% and a total content of other impurity metals was 59.17%. 1,000 g of the hafnium-containing waste residue was dissolved in concentrated sulfuric acid and ammonium sulfate, and a reaction was conducted at 250° C. for 3 h to obtain an acidic solution, where the hafnium-containing waste residue, the concentrated sulfuric acid, and the ammonium sulfate were in a mass ratio of 1:3.5:1.

Step 2: Adjustment of acidity of the acidic solution: The acidic solution obtained in step 1 was diluted with water to an acidity of 1.8 mol/L and filtered, and then a complexing agent composed of oxalic acid, acetic acid, and citric acid (a volume proportion of oxalic acid: 30%, a volume proportion of acetic acid: 40%, and a volume proportion of citric acid: 30%) was added in a volume proportion of 2% to obtain a material solution.

Step 3: Extraction of hafnium: Extraction was conducted with a mixture of an acidic phosphorus extractant P204, sulfonated kerosene, and sec-octanol (in a volume ratio of 3:14:1) as an organic phase and the material solution obtained in step 2 as an aqueous phase, where a ratio of the organic phase to the aqueous phase was controlled at 1:3.5, and the two phases were mixed for 20 min; and samples were collected from the tank and tested, and test results showed that 98.07% of hafnium in the material solution was extracted into the organic phase while 2.39% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 3 by adjusting a ratio of the organic phase to the aqueous phase, and the two phases were mixed for 30 min; then a purified hafnium-loaded organic phase (including 96.98% of hafnium in the hafnium-loaded organic phase) was obtained, and 99.94% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 1 mol/L oxalic acid solution, a 1 mol/L sodium carbonate solution, and a 1 mol/L ammonium bicarbonate solution were mixed to obtain a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 98.42% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 143.103 g of a hafnium oxide product (in the product, purity of $HfO_2$ was 99.994% and yield of hafnium was 90.02%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and acidity of the resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 97.78% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while 1.16% of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 99.34% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (96.87% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (97.68% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 70° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 707.817 g of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, content of oxides of impurity metals was 98.979%, and yield of impurity metals was 88.98%).

Example 6

Step 1: Dissolution of a raw material: 1 ton of a hafnium-containing waste residue of the same source as in Example 2 (including the metal elements of hafnium, titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium), where a content of hafnium was 34.54% and a total content of other impurity metals was 42.82%) was dissolved in concentrated sulfuric acid and ammonium sulfate, and a reaction was conducted at 250° C. for 3 h to obtain an acidic solution, where the hafnium-containing waste residue, the concentrated sulfuric acid, and the ammonium sulfate were in a mass ratio of 1:3.5:1.

Step 2: Adjustment of acidity of the acidic solution: The acidic solution obtained in step 1 was diluted with water to an acidity of 1.8 mol/L and filtered, and then 2% (v/v) oxalic acid was added as a complexing agent to obtain a material solution.

Step 3: Extraction of hafnium: Extraction was conducted with a mixture of an acidic phosphorus extractant P204, sulfonated kerosene, and sec-octanol (in a volume ratio of 3:14:1) as an organic phase and the material solution obtained in step 2 as an aqueous phase, where a ratio of the organic phase to the aqueous phase was controlled at 1:3.5, and the two phases were mixed for 20 min; and samples were collected from the tank and tested, and test results showed that 97.88% of hafnium in the material solution was extracted into the organic phase while 2.24% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 3 by adjusting a ratio of the organic phase to the aqueous phase, and the two phases were mixed for 30 min; then a purified hafnium-loaded organic phase (including 97.41% of hafnium in the hafnium-loaded organic phase) was obtained, and 99.92% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 3 mol/L oxalic acid solution was prepared as a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 98.42% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 367.587 kg of a hafnium oxide product (in the product, content of $HfO_2$ was 99.992% and yield of hafnium was 90.24%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and acidity of the resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 98.02% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while 1.09% of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 99.61% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (97.01% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (97.03% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 80° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 510.809 kg of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, purity of oxides was 98.957%, and yield of impurity metals was 88.73%).

Comparative Example 1

Step 1: Dissolution of a raw material: 1,000 g of a hafnium-containing waste residue of the same source as in Example 2 (including the metal elements of hafnium, titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium), where a content of hafnium was 34.54% and a total content of other impurity metals was 42.82%) was dissolved in a 2 mol/L sulfuric acid solution, and a reaction was conducted at 250° C. for 3 h to obtain an acidic solution, where a mass ratio of the hafnium-containing waste residue to the sulfuric acid solution was 1:3.5:1.

Step 2: Adjustment of acidity of the acidic solution: The acidic solution obtained in step 1 was diluted with water to an acidity of 1.8 mol/L and filtered, and then 2% (v/v) oxalic acid was added as a complexing agent to obtain a material solution.

Step 3: Extraction of hafnium: Extraction was conducted with a mixture of an acidic phosphorus extractant P204, sulfonated kerosene, and sec-octanol (in a volume ratio of 3:14:1) as an organic phase and the material solution obtained in step 2 as an aqueous phase, where a ratio of the organic phase to the aqueous phase was controlled at 1:3.5, and the two phases were mixed for 20 min; and samples were collected from the tank and tested, and test results showed that 92.50% of hafnium in the material solution was extracted into the organic phase while 5.08% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 3 by adjusting a ratio of the organic phase to the aqueous phase, and the two phases were mixed for 30 min; then a purified hafnium-loaded organic phase (including 93.21% of hafnium in the hafnium-loaded organic phase) was obtained, and 97.32% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 3 mol/L oxalic acid solution was prepared as a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 93.17% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 314.673 g of a hafnium oxide product (in the product, purity of $HfO_2$ was 98.099% and yield of hafnium was 77.25%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and acidity of the resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 95.91% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while a trace amount of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 99.54% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (93.89% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (92.48% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 80° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 461.054 g of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, purity of oxides of impurity metal ions was 98.992%, and yield of impurity metals was 80.09%).

Comparative Example 2

Step 1: Dissolution of a raw material: 1,000 g of a hafnium-containing waste residue of the same source as in Example 2 (including the metal elements of hafnium, titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium), where a content of hafnium was 34.54% and a total content of other impurity metals was 42.82%) was dissolved in concentrated sulfuric acid and ammonium sulfate, and a reaction was conducted at 250° C. for 3 h to obtain an acidic solution, where the hafnium-containing waste residue, the concentrated sulfuric acid, and the ammonium sulfate were in a mass ratio of 1:3.5:1.

Step 2: Adjustment of acidity of the acidic solution: The acidic solution obtained in step 1 was diluted with water to an acidity of 1.8 mol/L and filtered, and then 2% (v/v) oxalic acid was added as a complexing agent to obtain a material solution.

Step 3: Extraction of hafnium: Extraction was conducted with phenoxy carboxylic acid (PCA) as an organic phase and the material solution obtained in step 2 as an aqueous phase, where a ratio of the organic phase to the aqueous phase was controlled at 1:3.5, and the two phases were mixed for 20 min; and samples were collected from the tank and tested, and test results showed that 95.70% of hafnium in the material solution was extracted into the organic phase while 3.27% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where pH of a purification system was controlled at 3 by adjusting a ratio of the organic phase to the aqueous phase, and the two phases were mixed for 30 min; then a purified hafnium-loaded organic phase (including 96.21% of hafnium in the hafnium-loaded organic phase) was obtained, and 98.36% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 3 mol/L oxalic acid solution was prepared as a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 94.78% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 341.844 g of a hafnium oxide product (in the product, purity of $HfO_2$ purity was 99.07% and yield of hafnium was 83.92%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and an acidity of the resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 95.91% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while a trace amount of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase with titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 98.99% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (94.34% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (94.53% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 80° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 473.533 g of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, purity of impurity metal ions was 98.473%, and yield of impurity metals was 82.56%).

Comparative Example 3

Step 1: Dissolution of a raw material: 1,000 g of a hafnium-containing waste residue of the same source as in Example 3 (including the metal elements of hafnium, titanium, zirconium, vanadium, niobium, tantalum, chromium, molybdenum, tungsten, manganese, thallium, rhenium, and REMs (yttrium and scandium), where a content of hafnium was 18.76% and a total content of other impurity metals was 48.15%) was dissolved in concentrated sulfuric acid and ammonium sulfate, and a reaction was conducted at 250° C. for 3 h to obtain an acidic solution, where the hafnium-containing waste residue, the concentrated sulfuric acid, and the ammonium sulfate were in a mass ratio of 1:3.5:1.

Step 2: Adjustment of acidity of the acidic solution: The acidic solution obtained in step 1 was diluted with water to an acidity of 1.8 mol/L and filtered to obtain a material solution.

Step 3: Extraction of hafnium: Extraction was conducted with a mixture of an acidic phosphorus extractant P204, sulfonated kerosene, and sec-octanol (in a volume ratio of 3:14:1) as an organic phase and the material solution obtained in step 2 as an aqueous phase, where a ratio of the organic phase to the aqueous phase was controlled at 1:3.5, and the two phases were mixed for 20 min; and samples were collected from the tank and tested, and test results showed that 94.70% of hafnium in the material solution was extracted into the organic phase while 3.78% of impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution were brought into the organic phase to obtain a hafnium-loaded organic phase; and the remaining impurity metal ions (including titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium)) in the material solution remained in the aqueous phase to obtain an impurity metal ions-containing aqueous phase.

Step 4: Purification of hafnium: A sulfuric acid washing solution with an acidity of 5 mol/L was prepared and used as an aqueous phase to purify the hafnium-loaded organic phase obtained in step 3, where a pH of a purification system was controlled at 3 by adjusting a ratio of the organic phase to the aqueous phase, and the two phases were mixed for 30 min; then a purified hafnium-loaded organic phase (including 96.37% of hafnium in the hafnium-loaded organic phase) was obtained, and 99.45% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions in the hafnium-loaded organic phase entered the aqueous phase, thereby allowing the deep separation of hafnium from the impurity metal ions.

Step 5: stripping of hafnium: A 3 mol/L oxalic acid solution was prepared as a stripping liquid, and the purified hafnium-loaded organic phase obtained in step 4 was subjected to stripping with the stripping liquid, where a ratio of the organic phase to the aqueous phase was controlled at 4:1, and the two phases were mixed for 30 min; then a hafnium-containing stripping solution (including 93.98% of hafnium in the purified hafnium-loaded organic phase) was obtained.

Step 6: Precipitation and burning of hafnium: Ammonia water was added as a precipitating agent to the hafnium-containing stripping solution obtained in step 5 (endpoint pH: 10) to precipitate hafnium, filtration was conducted, and the resulting hafnium-containing precipitate was washed with water and burned at 850° C. to obtain 182.481 g of a hafnium oxide product (in the product, purity of $HfO_2$ was 99.60% and yield of hafnium was 82.48%).

Step 7: Precipitation of other impurity metals: The impurity metal ions-containing aqueous phase obtained in step 3 was precipitated with sodium hydroxide, and a resulting precipitate was washed with water to obtain precipitates of the impurity metal ions rich in titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium).

Step 8: Preparation of a solution of the impurity metal ions comprising impurity metal ions: A sulfuric acid solution was added to the precipitates of the impurity metal ions, and acidity of the resulting system was adjusted to 3 mol/L to obtain the solution of the impurity metal ions comprising titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) ions.

Step 9: Extraction of impurity metal ions: Extraction was conducted with a mixture of an acidic phosphorus extractant P204, sulfonated kerosene, and sec-octanol (in a volume ratio of 4:19:2) as an organic phase and the solution of the impurity metal ions obtained in step 8 as an aqueous phase, where a ratio of the organic phase to the aqueous phase was controlled at 1:8, and the two phases were mixed for 30 min; and samples were collected from the tank and tested, and test results showed that 94.43% of titanium, zirconium, niobium, tantalum, chromium, molybdenum, tungsten, and REMs (lanthanum, cerium, praseodymium, neodymium, samarium, europium, gadolinium, terbium, dysprosium, yttrium, and scandium) in the solution of the impurity metal ions were extracted into the organic phase while a trace amount of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 7 mol/L was prepared and used as an aqueous phase to purify the impurity metal ions-loaded organic phase comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 9 to obtain a purified impurity metal ions-loaded organic phase, where a ratio of the organic phase to the aqueous phase was controlled at 7:1, and the two phases were mixed for 30 min; and 99.07% of hafnium in the impurity metal ions-loaded organic phase entered the aqueous phase, thereby allowing the deep separation of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (95.34% of the impurity metal ions in the impurity metal ions-loaded organic phase) from hafnium.

Step 11: stripping of impurity metal ions: A 24% ammonium bicarbonate solution was prepared as a stripping liquid, and the purified impurity metal ions-loaded organic phase obtained in step 10 was subjected to stripping with the stripping liquid, where a ratio of the organic phase to the stripping liquid was controlled at 2:1, and the two phases were mixed for 10 min; then an impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions (94.53% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions obtained in step 11 (endpoint pH was controlled at 2 and temperature was controlled at 80° C.) to precipitate titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) ions, filtration was conducted, and the resulting precipitate was washed with water and burned at 850° C. to obtain 529.817 g of oxides of titanium, zirconium, niobium, tantalum, chromium, molybdenum, tungsten, and REM (lanthanum, cerium, praseodymium, neodymium, samarium, europium, gadolinium, terbium, dysprosium, yttrium, and scandium) (in the product, purity of oxides of impurity metal ions was 98.005%, and yield of impurity metals was 81.85%).

Comparative Example 4

Step 1: Dissolution of a raw material: A hafnium-containing waste residue to be recycled in this example was derived from a zirconium tailing (the same source as in Example 3). The hafnium-containing waste residue included the metal elements of hafnium, titanium, zirconium, vanadium, niobium, tantalum, chromium, molybdenum, tungsten, manganese, thallium, rhenium, and REMs (yttrium and scandium); and a content of hafnium was 18.76% and a total content of other impurity metals was 48.15%. 1,000 g of the hafnium-containing waste residue was dissolved in concentrated sulfuric acid and ammonium sulfate, and a reaction was conducted at 300° C. for 2 h to obtain an acidic solution, where the hafnium-containing waste residue, the concentrated sulfuric acid, and the ammonium sulfate were in a mass ratio of 1:2:0.8.

Step 2: Adjustment of acidity of the acidic solution: The acidic solution obtained in step 1 was diluted with water to an acidity of 1 mol/L and filtered, and then acetic acid was added as a complexing agent in a volume proportion of 1% to obtain a material solution.

Step 3: Extraction of hafnium: Extraction was conducted with a mixture of an acidic phosphorus extractant P507, sulfonated kerosene, and sec-octanol (in a volume ratio of 8:18:2) as an organic phase and the material solution obtained in step 2 as an aqueous phase, where a ratio of the organic phase to the aqueous phase was controlled at 1:5, and the two phases were mixed for 10 min; and samples were collected from the tank and tested, and test results showed that 97.05% of hafnium in the material solution was extracted into the organic phase while 3.48% of impurity metal ions (including titanium, zirconium, vanadium, niobium, tantalum, chromium, molybdenum, tungsten, manganese, thallium, rhenium, and REMs (yttrium and scandium)) in the material solution were brought into the organic phase to obtain a hafnium-loaded organic phase; and the remaining impurity metal ions (including titanium, zirconium, vanadium, niobium, tantalum, chromium, molybdenum, tungsten, manganese, thallium, rhenium, and REMs (yttrium and scandium)) in the material solution remained in the aqueous phase to obtain an impurity metal ions-containing aqueous phase.

Step 4: Purification of hafnium: A sulfuric acid washing solution with an acidity of 6 mol/L was prepared and used as an aqueous phase to purify the hafnium-loaded organic phase obtained in step 3, where pH of a purification system was controlled at 2 by adjusting a ratio of the organic phase to the aqueous phase, and the two phases were mixed for 10 min; then a purified hafnium-loaded organic phase (including 98.93% of hafnium in the hafnium-loaded organic phase) was obtained, and 99.64% of titanium, zirconium, vanadium, niobium, tantalum, chromium, molybdenum, tungsten, manganese, thallium, rhenium, and REMs (yttrium and scandium) ions in the hafnium-loaded organic phase entered the aqueous phase, thereby allowing the deep separation of hafnium from the impurity metal ions.

Step 5: stripping of hafnium: A 1 mol/L nitric acid solution was prepared as a stripping liquid, and the purified hafnium-loaded organic phase obtained in step 4 was subjected to stripping with the stripping liquid, where a ratio of the organic phase to the aqueous phase was controlled at 6:1, and the two phases were mixed for 30 min; then a hafnium-containing stripping solution (including 95.43% of hafnium in the purified hafnium-loaded organic phase) was obtained.

Step 6: Precipitation and burning of hafnium: 3 mol/L hydrochloric acid was added as a precipitating agent to the hafnium-containing stripping solution obtained in step 5 (endpoint pH: 2, and temperature: 60° C.) to precipitate hafnium, filtration was conducted, and the resulting hafnium-containing precipitate was washed with water and burned at 800° C. to obtain 194.939 g of a hafnium oxide product (in the product, purity of $HfO_2$ was 99.332% and yield of hafnium was 90.41%).

Step 7: Precipitation of other impurity metals: The impurity metal ions-containing aqueous phase obtained in step 3 was precipitated with sodium hydroxide, and a resulting precipitate was washed with water to remove the complexing agent to obtain precipitates of the impurity metal ions rich in titanium, zirconium, vanadium, niobium, tantalum, chromium, molybdenum, tungsten, manganese, thallium, rhenium, and REMs (yttrium and scandium).

Step 8: Preparation of a solution of the impurity metal ions comprising impurity metal ions: A sulfuric acid solution was added to the precipitates of the impurity metal ions, and acidity of the resulting system was adjusted to 1 mol/L to obtain the solution of the impurity metal ions comprising titanium, zirconium, vanadium, niobium, tantalum, chromium, molybdenum, tungsten, manganese, thallium, rhenium, and REM (yttrium and scandium) ions.

Step 9: Extraction of impurity metal ions: Extraction was conducted with a mixture of an acidic phosphorus extractant P507, sulfonated kerosene, and sec-octanol (in a volume ratio of 10:20:3) as an organic phase and the solution of the impurity metal ions obtained in step 8 as an aqueous phase, where a ratio of the organic phase to the aqueous phase was controlled at 1:6, and the two phases were mixed for 30 min; and samples were collected from the tank and tested, and test results showed that 97.18% of titanium, zirconium, vanadium, niobium, tantalum, chromium, molybdenum, tungsten, manganese, thallium, rhenium, and REMs (yttrium and scandium) in the solution of the impurity metal ions were extracted into the organic phase while a trace amount of hafnium in the solution of the impurity metal ions was brought into the organic phase to obtain an impurity metal ions-loaded organic phase.

Step 10: Purification of the impurity metal ions-loaded organic phase comprising impurity metal ions: A sulfuric acid washing solution with an acidity of 8 mol/L was prepared and used as an aqueous phase to purify the impurity metal ions-loaded organic phase comprising titanium, zirconium, vanadium, niobium, tantalum, chromium, molybdenum, tungsten, manganese, thallium, rhenium, and REM (yttrium and scandium) ions obtained in step 9 to obtain a purified impurity metal ions-loaded organic phase, where a ratio of the organic phase to the aqueous phase was controlled at 2:1, and the two phases were mixed for 20 min; and 97.09% of hafnium in the impurity metal ions-loaded organic phase entered the aqueous phase, thereby allowing the deep separation of titanium, zirconium, vanadium, niobium, tantalum, chromium, molybdenum, tungsten, manganese, thallium, rhenium, and REM (yttrium and scandium) ions (95.09% of the impurity metal ions in the impurity metal ions-loaded organic phase) from hafnium.

Step 11: stripping of impurity metal ions: A 4% nitric acid solution was prepared as a stripping liquid, and the purified impurity metal ions-loaded organic phase obtained in step 10 was subjected to stripping with the stripping liquid, where a ratio of the organic phase to the stripping liquid was controlled at 7:1, and the two phases were mixed for 15 min; then an impurity metal ions-containing stripping solution comprising titanium, zirconium, vanadium, niobium, tantalum, chromium, molybdenum, tungsten, manganese, thallium, rhenium, and REM (yttrium and scandium) ions (94.79% of impurity metal ions in the purified impurity metal ions-loaded organic phase) was obtained.

In steps 3, 4, 5, 9, 10, and 11, the extraction was 5 stage countercurrent extraction, the purification was 4 stage countercurrent purification, and the stripping was 4 stage countercurrent stripping.

Step 12: Precipitation and burning of impurity metal ions: Hydrochloric acid was added as a precipitating agent to the impurity metal ions-containing stripping solution comprising titanium, zirconium, vanadium, niobium, tantalum, chromium, molybdenum, tungsten, manganese, thallium, rhenium, and REM (yttrium and scandium) ions obtained in step 11 (endpoint pH was controlled at 1 and temperature was controlled at 60° C.) to precipitate titanium, zirconium, vanadium, niobium, tantalum, chromium, molybdenum, tungsten, manganese, thallium, rhenium, and REM (yttrium and scandium) ions, filtration was conducted, and the resulting precipitate was washed with water and burned at 950° C. to obtain 545.312 g of oxides of titanium, zirconium, vanadium, niobium, tantalum, chromium, molybdenum, tungsten, manganese, thallium, rhenium, and REM (yttrium and scandium) (in the product, purity of oxides of impurity metals was 97.578%, and yield of impurity metals was 84.24%).

It can be seen from the comparison between the examples and the comparative examples that the use of ammonium sulfate in preparation of the acidic solution is important, and the use of sulfuric acid alone has low adaptability to impurities and thus is not suitable for circumstance where there are various impurities, leads to low solubility and weak complexation, and does not allow separation of niobium and tantalum with similar properties to hafnium; when another common extractant for extracting both zirconium and hafnium is used, hafnium cannot be well extracted; when an organic acid complexing agent is not added, metal ions cannot be well stabilized, which affects the recovery effect; and when a nitric acid solution is used as a stripping liquid for stripping of a purified organic phase, excellent stripping effects cannot be obtained, the consumption of the acidic phosphorus extractant cannot be reduced, and the concentration of acidic salt is high.

The above are preferred implementations of the present disclosure. It should be noted that various improvements and modifications can be made by a person of ordinary skill in the art without departing from the principles of the present disclosure. These improvements and modifications should also be regarded as falling into the protection scope of the present disclosure.

The invention claimed is:

1. A method for recovering hafnium and impurity metals from a hafnium-containing waste residue, comprising the following steps:

(1) adjusting acidity of an acidic solution of the hafnium-containing waste residue to 1 mol/L to 3 mol/L, removing a resulting residue through filtration, and adding a complexing agent to a resulting mother liquor to obtain a material solution;

(2) conducting extraction with a mixture of an acidic phosphorus extractant, sulfonated kerosene, and sec-octanol as an organic phase and the material solution obtained in step (1) as an aqueous phase to obtain a hafnium-loaded organic phase and an impurity metal ions-containing aqueous phase; purifying the hafnium-loaded organic phase with a sulfuric acid solution; and subjecting a purified hafnium-loaded organic phase to stripping with a stripping liquid to obtain a hafnium-containing stripping solution;

(3) adding a precipitating agent to the hafnium-containing stripping solution obtained in step (2), filtering to obtain a precipitate, and washing and burning the precipitate to obtain hafnium oxide;

(4) precipitating the impurity metal ions-containing aqueous phase obtained in step (2) with a strong alkali; washing a resulting precipitate to remove the complexing agent to obtain precipitates of the impurity metal ions; and adding a sulfuric acid solution to adjust acidity of a resulting solution from the precipitates of the impurity metal ions and the sulfuric acid solution to 1 mol/L to 5 mol/L and to obtain a solution of the impurity metal ions;

(5) conducting extraction with a mixture of an acidic phosphorus extractant, sulfonated kerosene, and sec-octanol as an organic phase and the solution of the impurity metal ions obtained in step (4) as an aqueous phase to obtain an impurity metal ions-loaded organic phase; purifying the impurity metal ions-loaded organic phase with a sulfuric acid solution; and subjecting a purified impurity metal ions-loaded organic phase to stripping with a stripping liquid to obtain an impurity metal ions-containing stripping solution; and (6) adding a precipitating agent to the impurity metal ions-containing stripping solution obtained in step (5), filtering to obtain a precipitate, and washing and burning the precipitate to obtain oxides of the impurity metals;

wherein in step (1), the acidic solution of the hafnium-containing waste residue is obtained by dissolving the hafnium-containing waste residue in sulfuric acid and ammonium sulfate; and in step (2), the stripping liquid is at least one selected from the group consisting of an oxalic acid solution, a sodium carbonate solution, and an ammonium bicarbonate solution.

2. The method for recovering hafnium and impurity metals from a hafnium-containing waste residue according to claim 1, wherein the method comprising at least one selected from the group consisting of the following items:

in step (1), the complexing agent is ammonium sulfate or an organic acid; and in step (2), the acidic phosphorus extractant is P204 and/or P507.

3. The method for recovering hafnium and impurity metals from a hafnium-containing waste residue according to claim 2, wherein the method comprising at least one selected from the group consisting of the following items:

in step (1), the acidic solution is obtained by mixing the hafnium-containing waste residue with concentrated sulfuric acid and ammonium sulfate and conducting a complete reaction at 200° C. to 300° C.; and the organic acid is one or more selected from the group consisting of oxalic acid, acetic acid, and citric acid.

4. The method for recovering hafnium and impurity metals from a hafnium-containing waste residue according to claim 3, wherein the hafnium-containing waste residue, the concentrated sulfuric acid, and the ammonium sulfate are mixed in a mass ratio of 1:(2-5):(0.8-1.5).

5. The method for recovering hafnium and impurity metals from a hafnium-containing waste residue according to claim 1, wherein the method comprising at least one selected from the group consisting of the following items:

in step (1), a volume of the complexing agent is 1% to 5% of a volume of the mother liquor;

in step (2), the acidic phosphorus extractant, the sulfonated kerosene, and the sec-octanol in the organic phase are in a volume ratio of (1-8):(10-18):(1-2);

in step (2), a volume ratio of the organic phase to the aqueous phase is 1: (0.2-5);

in step (2), the purification is conducted by adjusting pH of a resulting purifying system with sulfuric acid to 1 to 5;

in step (2), the stripping liquid has a concentration of 0.25 mol/L to 6 mol/L; and in step (2), a volume ratio of the purified hafnium-loaded organic phase to the stripping liquid is (3-6):1.

6. The method for recovering hafnium and impurity metals from a hafnium-containing waste residue according to claim 5, wherein in step (2), the purification is conducted by adjusting the pH of the resulting purifying system with the sulfuric acid to 3.

7. The method for recovering hafnium and impurity metals from a hafnium-containing waste residue according to claim 2, wherein when the stripping liquid in step (2) is an oxalic acid solution, in step (3), the precipitating agent is ammonia water and a resulting solution from the hafnium-containing stripping solution and the precipitating agent has an endpoint pH ranging from 8 to 10; and when the stripping liquid in step (2) is a sodium carbonate and/or ammonium bicarbonate solution, in step (3), the precipitating agent is hydrochloric acid and a resulting solution from the hafnium-containing stripping solution and the precipitating agent has an endpoint pH ranging from 1 to 5, and temperature is controlled at 50° C. to 120° C.

8. The method for recovering hafnium and impurity metals from a hafnium-containing waste residue according to claim 7, wherein when the stripping liquid in step (2) is a sodium carbonate or ammonium bicarbonate solution, in step (3), the precipitating agent is hydrochloric acid and the resulting solution from the hafnium-containing stripping solution and the precipitating agent has an endpoint pH ranging from 1 to 3, and the temperature is controlled at 60° C. to 100° C.

9. The method for recovering hafnium and impurity metals from a hafnium- containing waste residue according to claim 1, wherein the method comprising at least one selected from the group consisting of the following items:
   in step (3), the burning is conducted at 700° C. to 1,200° C.; and
   in step (6), the burning is conducted at 700° C. to 1,200° C.

10. The method for recovering hafnium and impurity metals from a hafnium- containing waste residue according to claim 1, wherein the method comprising at least one selected from the group consisting of the following items:
   in step (5), the acidic phosphorus extractant is P204 and/or P507; and
   in step (5), the stripping liquid is at least one selected from the group consisting of an oxalic acid solution, a sodium carbonate solution, and an ammonium bicarbonate solution.

11. The method for recovering hafnium and impurity metals from a hafnium- containing waste residue according to claim 10, wherein in step (5), the stripping liquid is at least one selected from the group consisting of a mass percentage of 1% to 18% oxalic acid solution, a mass percentage of 3% to 25% sodium carbonate solution, and a mass percentage of 3% to 25% ammonium bicarbonate solution.

12. The method for recovering hafnium and impurity metals from a hafnium- containing waste residue according to claim 1, wherein the method comprising at least one selected from the group consisting of the following items:
   in step (5), a volume ratio of the organic phase to the aqueous phase is 1:(0.1-8);
   in step (5), the sulfuric acid solution has an acidity of 3 mol/L to 8 mol/L;
   in step (5), a volume ratio of the impurity metal ions-loaded organic phase to the sulfuric acid solution is (2-8):1; and in step (5), a volume ratio of the purified impurity metal ions-loaded organic phase to the stripping liquid is (2-8):1.

13. The method for recovering hafnium and impurity metals from a hafnium-containing waste residue according to claim 1, wherein in step (5), the acidic phosphorus extractant, the sulfonated kerosene, and the sec-octanol in the organic phase are in a volume ratio of (1-10):(8-20):(1-3).

14. The method for recovering hafnium and impurity metals from a hafnium-containing waste residue according to claim 2, wherein,
   when the stripping liquid in step (5) is an oxalic acid solution, in step (6), the precipitating agent is ammonia water and a resulting solution from the impurity metal ions-containging stripping solution and the precipitating agent has an endpoint pH ranging from 8 to 10; and
   when the stripping liquid in step (5) is a sodium carbonate or ammonium bicarbonate solution, in step (6), the precipitating agent is hydrochloric acid and a resulting solution from the impurity metal ions-containing stripping solution and the precipitating agent has an endpoint pH ranging from from 1 to 5, and temperature is controlled at 50° C. to 120° C.

15. The method for recovering hafnium and impurity metals from a hafnium-containing waste residue according to claim 14, wherein when the stripping liquid in step (5) is a sodium carbonate or ammonium bicarbonate solution, in step (6), the precipitating agent is hydrochloric acid and the resulting solution from the impurity metal ions-containing stripping solution and the precipitating agent has an endpoint pH ranging from 1 to 3, and the temperature is controlled at 60° C. to 100° C.

16. The method for recovering hafnium and impurity metals from a hafnium-containing waste residue according to claim 2, wherein the method comprising at least one selected from the group consisting of the following items:
   in step (4), the precipitate is washed with water to remove the complexing agent; and
   in step (4), the acidity is adjusted with water or a sulfuric acid solution.

17. The method for recovering hafnium and impurity metals from a hafnium-containing waste residue according to claim 2, wherein in steps (2) and (5), the extraction refers to 3-5 stage countercurrent extraction, the purification refers to 3-4 stage countercurrent purification, and the stripping refers to 3-4 stage countercurrent stripping.

\* \* \* \* \*